(12) United States Patent
Kim

(10) Patent No.: US 10,203,007 B2
(45) Date of Patent: Feb. 12, 2019

(54) METHOD AND APPARATUS FOR DETECTING TOUCH POINT OF CLUTCH

(71) Applicant: Hyundai Autron Co., Ltd., Seongnam-si (KR)

(72) Inventor: Min-Hyo Kim, Gunpo-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 322 days.

(21) Appl. No.: 15/293,547

(22) Filed: Oct. 14, 2016

(65) Prior Publication Data

US 2017/0030421 A1    Feb. 2, 2017

Related U.S. Application Data

(63) Continuation of application No. 14/565,402, filed on Dec. 9, 2014, now Pat. No. 9,494,203.

(30) Foreign Application Priority Data

Sep. 15, 2014    (KR) .......................... 10-2014-0121886

(51) Int. Cl.
*F16D 48/06* (2006.01)
*F16D 48/08* (2006.01)

(52) U.S. Cl.
CPC ............ *F16D 48/08* (2013.01); *F16D 48/06* (2013.01); *F16D 2500/1045* (2013.01); *F16D 2500/10412* (2013.01); *F16D 2500/3067* (2013.01); *F16D 2500/3068* (2013.01); *F16D 2500/30415* (2013.01); *F16D 2500/30417* (2013.01); *F16D 2500/50245* (2013.01); *F16D 2500/50251* (2013.01); *F16D 2500/50275* (2013.01); *F16D 2500/7041* (2013.01); *F16D 2500/70264* (2013.01)

(58) Field of Classification Search
None
See application file for complete search history.

(56) References Cited

FOREIGN PATENT DOCUMENTS

CN        102483110 A        5/2012

*Primary Examiner* — Jacob S. Scott
(74) *Attorney, Agent, or Firm* — Baker McKenzie; Hyunho Park

(57) ABSTRACT

Disclosed are a method and an apparatus for detecting a touch point of a clutch and the method includes: maintaining a touch point of the clutch; correcting a setting value for determining a lowest value by calculating drag torque using a speed and an acceleration of a input shaft to change a detection range of the touch point; setting the lowest value of the speed of the input shaft within the changed detection range of the touch point to a reference value of the input shaft after actuating the clutch; releasing the clutch when the speed of the input shaft is more than a value acquired by adding the reference value of the input shaft and the corrected setting value for determining the lowest value; and updating the touch point as a clutch position matched to the reference value.

14 Claims, 5 Drawing Sheets

METHOD AND APPARATUS FOR DETECTING TOUCH POINT OF CLUTCH

CROSS-REFERENCE TO RELATED APPLICATIONS

This application claims priority to Korean Patent Application No. 10-2014-0121886 filed in the Korean Intellectual Property Office on Sep. 15, 2014, and a U.S. patent application Ser. No. 14/565,402, filed Dec. 9, 2014, each of which is incorporated herein in its entirety.

TECHNICAL FIELD

The present disclosure relates to a method and an apparatus for detecting a touch point of a clutch.

BACKGROUND ART

An automated manual transmission (AMT) or a double clutch transmission (DCT) has a clutch capable of automatically transmitting power by an actuator and when the clutch is used as a dry type, since a touch point which is an actuation start point of the clutch is changed by a change in temperature of the clutch or abrasion, appropriate adjustment of the touch point is required to maintain stable operability of the clutch.

FIG. 1 is a graph showing characteristics of clutch torque in respect to a stroke of a clutch actuator, in which when the stroke increases and reaches the touch point, the clutch torque starts to increase at last and then, when a state of the clutch is normal, maximum clutch torque designed to be larger than maximum engine torque which an engine may transfer in a maximum stroke may be transferred, but when the touch point moves due to the change in temperature of the clutch or the abrasion, the maximum engine torque may not be completely transferred even in the maximum stroke.

Like this, the touch point is a primary factor that continuously stably maintains an appropriate control relationship between the clutch actuator and the clutch and FIG. 2 is a diagram for describing a method for detecting and setting a touch point of a clutch in the related art, in which the method is performed while stopping or when a gear box is neutral directly after engine cranking.

That is, in the related art, the position of the clutch actuator is determined as the touch point at the time (B) when the clutch starts to rotate by actuating the clutch actuator toward a direction in which the clutch is joined from a position in which the clutch is not joined (A) and the position is adjusted to a new touch point (C) and thereafter, the clutch actuator is actuated based on the newly set touch point.

To this end, in the related art, since the touch point of the clutch is detected with respect to a change of angular acceleration of an input shaft, the touch point of the clutch may be mis-detected depending on a variation of angular acceleration of the input shaft.

SUMMARY OF THE INVENTION

The present disclosure has been made in an effort to provide a method and an apparatus for detecting a touch point of a clutch, which are capable of improving controllability of the clutch with respect to a change in characteristics of the clutch by accurately detecting the touch point of the clutch.

An exemplary embodiment of the present disclosure provides a method for detecting a touch point of a clutch in a shift control module, the method comprises: maintaining a touch point of the clutch; correcting a setting value for determining a lowest value by calculating drag torque using a speed and an acceleration of a input shaft to change a detection range of the touch point; setting the lowest value of the speed of the input shaft within the changed detection range of the touch point to a reference value of the input shaft after actuating the clutch; releasing the clutch when the speed of the input shaft is more than a value acquired by adding the reference value of the input shaft and the corrected setting value for determining the inflection point; and updating the touch point as a clutch position matched to the reference value.

In the changing of the detection range of the touch point, an upper limit value of the clutch position is changed through the setting value for determining the lowest value is changed.

The upper limit value of the clutch position is proportional to the setting value for determining the lowest value.

The updated touch point is a value acquired by subtracting a touch point offset value from the upper limit value of the clutch position corresponding to the corrected setting value for determining the inflection point.

The touch point offset value is proportional to a slope of the touch point.

Another exemplary embodiment of the present disclosure provides an apparatus for detecting a touch point of a clutch, the apparatus comprising: a engine speed sensor configured to sense a speed and an acceleration of an input shaft; and a clutch control module configured to correct a setting value for determining a lowest value by calculating drag torque using a speed and an acceleration of a input shaft to change a detection range of the touch point, set the lowest value of the speed of the input shaft within the changed detection range of the touch point to a reference value of the input shaft after actuating the clutch, release the clutch when the speed of the input shaft is more than a value acquired by adding the reference value of the input shaft and the corrected setting value for determining the inflection point and update the touch point as a clutch position matched to the reference value.

The clutch control module changes an upper limit value of the clutch position through the setting value for determining the lowest value is changed.

The upper limit value of the clutch position is proportional to the setting value for determining the lowest value.

The updated touch point is a value acquired by subtracting a touch point offset value from the upper limit value of the clutch position corresponding to the corrected setting value for determining the inflection point.

The touch point offset value is proportional to a slope of the touch point.

Figure 1:
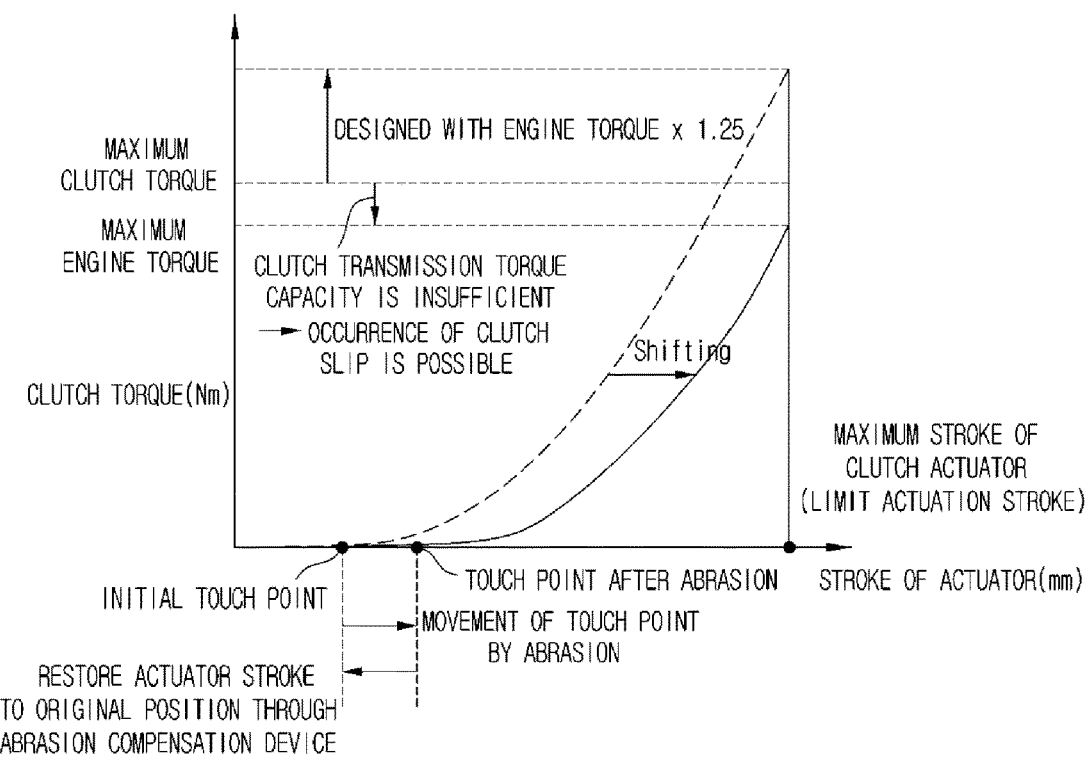
FIG. 1 is a graph showing characteristics of clutch torque in respect to a stroke of a clutch actuator.
Figure 2:
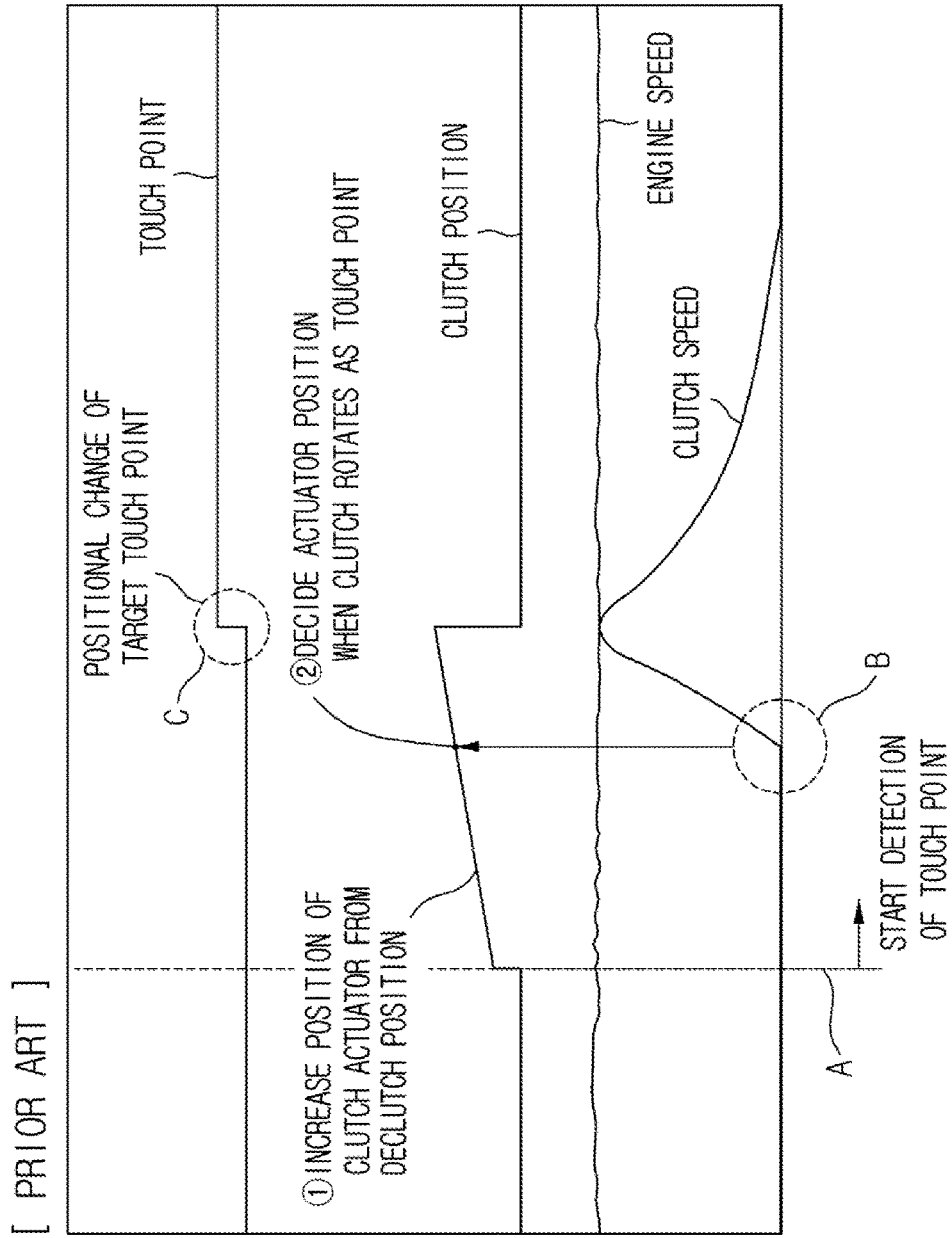
FIG. 2 is a diagram for describing a method for detecting and setting a touch point of a clutch in the related art.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is noted that technical terms used in the specification are used to just describe a specific exemplary embodiment and do not intend to limit the present disclosure. Further, unless otherwise defined in the specification, the technical terms used in the specification should be interpreted as meanings generally appreciated by those skilled in the art and should not be interpreted as excessively comprehensive meanings or excessively reduced meanings. Further, when the technical term used in the specification is a wrong technical term that does not accurately express the spirit of the present disclosure, the technical term should be understood by being substituted by a technical term which can be correctly understood by those skilled in the art. In addition, a general term used in the present disclosure should be interpreted as defined in a dictionary or contextually, and should not be interpreted as an excessively reduced meaning.

Unless otherwise apparently specified contextually, a singular expression used in the specification includes a plural expression. In the specification, a term such as "comprising" or "including" should not be interpreted as necessarily including all various components or various steps disclosed in the specification, and it should be interpreted that some component or some steps among them may not be included or additional components or steps may be further included.

"Module" and "unit" which are suffixes for the components used in the specification are granted or mixed by considering only easiness in preparing the specification and do not have meanings or roles distinguished from each other in themselves.

Terms including ordinal numbers, such as 'first' and 'second', used in the specification can be used to describe various components, but the components should not be limited by the terms. The above terms are used only to discriminate one component from another component. For example, a first component may be named a second component and similarly, the second component may also be named the first component, without departing from the scope of the present disclosure.

Hereinafter, exemplary embodiments of the present disclosure will be described in detail with reference to the accompanying drawings, in which like reference numerals refer to like or similar elements regardless of reference numerals and a duplicated description thereof will be omitted.

In describing the present disclosure, when it is determined that the detailed description of the publicly known art related to the present disclosure may obscure the gist of the present disclosure, the detailed description thereof will be omitted. Further, it is noted that the accompanying drawings are only for easily understanding the spirit of the present disclosure and it should not be interpreted that the spirit of the present disclosure is limited by the accompanying drawings.

Figure 3:
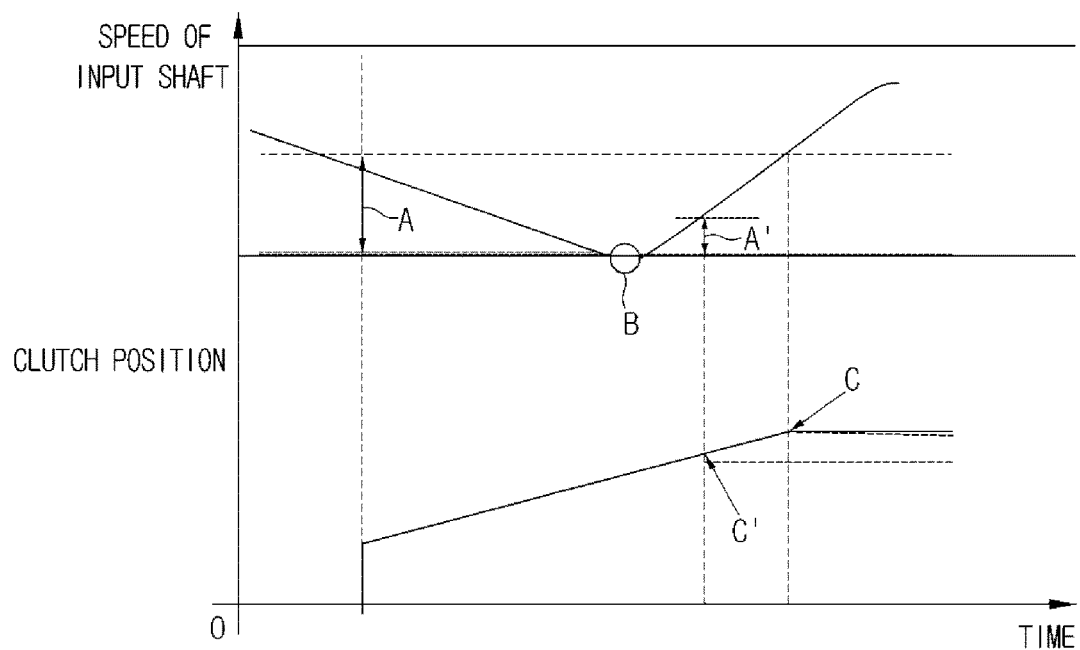
FIG. 3 is a graph for describing a method for changing a detection range of a touch point depending on a speed and an acceleration of an input shaft according to an exemplary embodiment of the present disclosure.

FIG. 3 is a graph for describing a method for changing a detection range of a touch point depending on a speed and an acceleration of an input shaft according to an exemplary embodiment of the present disclosure.

Referring to FIG. 3, a setting value for determining a inflection points A and A' represent a range for detecting the touch point and vary depending on drag torque calculated by using the speed and the acceleration of the input shaft (alternatively, a non-driving shaft). That is, reference numeral A represents the setting value for determining the inflection point before correction and reference numeral A' represents the setting value for determining the inflection point after correction. The inflection points represent a lowest value of the speed.

Meanwhile, an upper limit value of the clutch position is changed through the setting value for determining the lowest value is changed. As the setting value for determining the inflection points A and A' are changed, an upper limit value of the position (hereinafter, referred to as "clutch position") of the clutch is changed, and reference numeral C represents an upper limit value of the clutch position corresponding to the setting value for determining the inflection point A before correction and reference numeral C' represents the upper limit value of the clutch position corresponding to the setting value for determining the inflection point A' after correction. That is, it can be seen that the larger the setting value for determining the inflection point is, the larger the upper limit value of the clutch position is, and the smaller the setting value for determining the inflection point is, the smaller the upper limit value of the clutch position is. The reason is that the smaller a slope of the speed of the input shaft, that is, the acceleration of the input shaft is, the larger the drag torque is.

A reference value B of the input shaft as an inflection point represents the lowest value of the speed of the input shaft and as illustrated in FIG. 3, the clutch position corresponding to the reference value B of the input shaft becomes the touch point.

As described above, in the exemplary embodiment of the present disclosure, as the detection range of the touch point is changed depending on the speed and the acceleration of the input shaft, the accuracy of the detection of the touch point may be increased.

Figure 4:
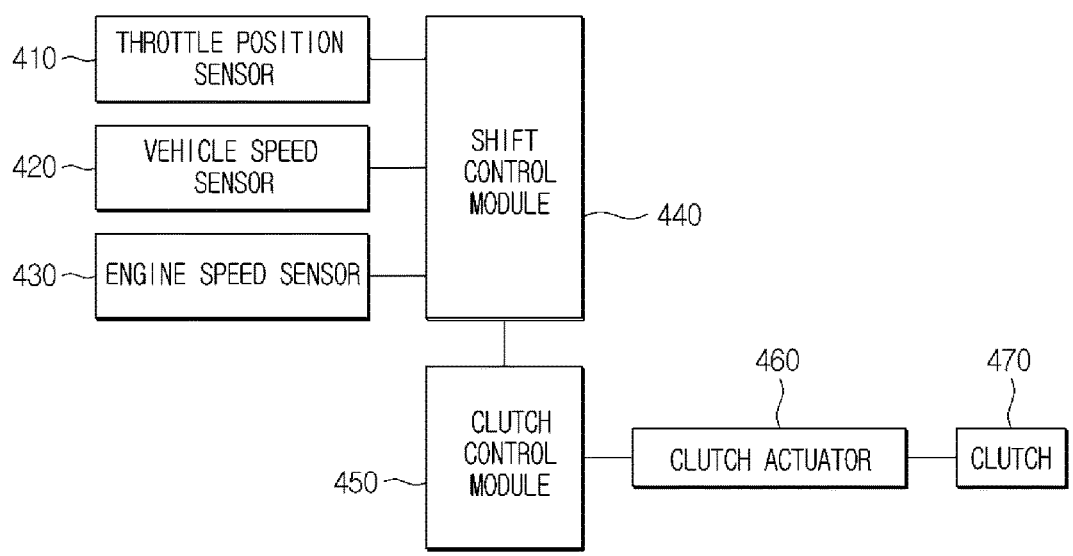
FIG. 4 is a block diagram illustrating a schematic internal configuration of an apparatus for detecting a touch point of a clutch according to an exemplary embodiment of the present disclosure.

FIG. 4 is a block diagram illustrating a schematic internal configuration of an apparatus for detecting a touch point of a clutch according to an exemplary embodiment of the present disclosure.

Referring to FIG. 4, the apparatus for detecting a touch point of a clutch according to the present disclosure includes a throttle position sensor 410, a vehicle speed sensor 420, an engine speed sensor 430, a shift control module 440, a clutch control module 450, a clutch actuator 460, and a clutch 470.

The throttle position sensor 410 senses an opening angle of a throttle valve (not illustrated).

The vehicle speed sensor 420 senses the speed of a vehicle.

The engine speed sensor 430 senses the speed and the acceleration of the input shaft output from an engine (not illustrated).

The shift control module 440 determines whether a gear is shifted based on the opening angle sensed by the throttle position sensor 410, the speed of the vehicle sensed by the vehicle speed sensor 420, and the speed of the input shaft sensed by the engine speed sensor 430.

In this case, when the gear is shifted, the shift control module 440 transfers a shift command signal to the clutch control module 450, controls a shift motor (not illustrated) and a select motor (not illustrated) to shift the gear, and transfers a shift completion signal to the clutch control module 450 when the gear shifting is completed.

The clutch control module 450 controls the clutch actuator 460 according to the shift command signal and the shift completion signal received from the shift control module 440 to move the clutch position.

Meanwhile, the clutch control module 450 maintains a touch point of the clutch. The clutch control module 450 according to the present disclosure calculates the drag torque by using the speed and the acceleration of the input shaft sensed by the engine speed sensor 430 to correct the setting value for determining the inflection point and changes the upper limit value of the clutch position depending on the corrected setting value for determining the inflection point to change the detection range of the touch point. In addition, the clutch control module 450 sets the lowest value of the speed of the input shaft within the changed detection range of the touch point to a reference value of the input shaft and updates the touch point as a clutch position matched to the reference value. The clutch control module 450 updates the clutch position corresponding to the set reference value of the input shaft to the touch point.

A detailed method in which the clutch control module 450 updates the touch point as described above will be described with reference to FIG. 5.

The clutch actuator 460 controls the clutch position according to the control signal transferred from the clutch control module 450.

Figure 5:
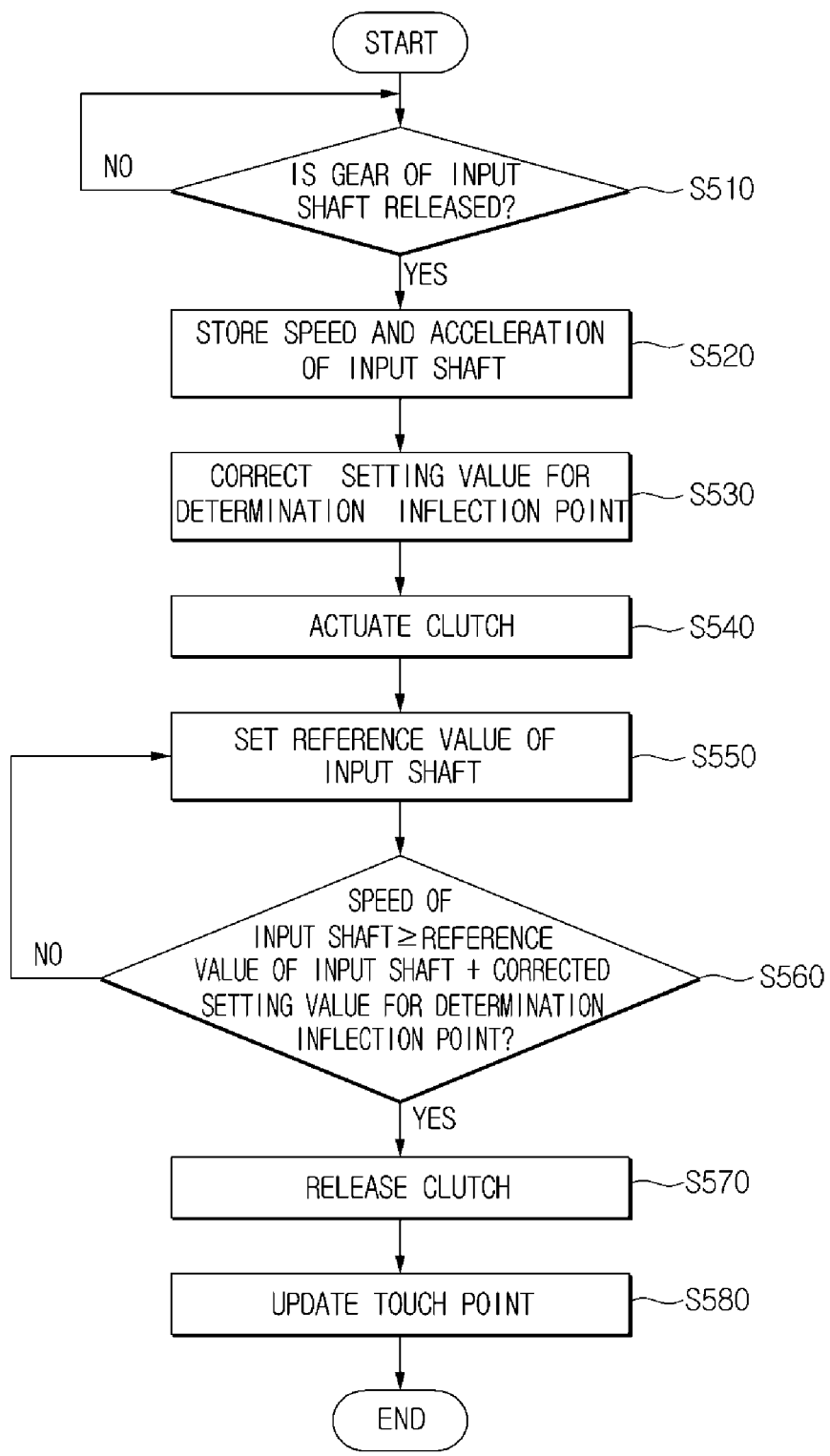
FIG. 5 is a flowchart illustrating a method for detecting a touch point of a clutch according to another exemplary embodiment of the present disclosure.

FIG. 5 is a flowchart illustrating a method for detecting a touch point of a clutch according to another exemplary embodiment of the present disclosure.

Referring to FIG. 5, the clutch control module 450 verifies releasing the input-shaft gear (S510) and thereafter, stores the speed and the acceleration of the input shaft when the input-shaft gear is released (S520).

The clutch control module 450 corrects the setting value for determining the inflection point by calculating the drag torque through the stored speed and acceleration of the input shaft to change the detection range of the touch point (S530).

Subsequently, the clutch control module 450 actuates the clutch 470 (S540) and thereafter, updates the lowest value of the speed of the input shaft within the changed detection range of the touch point to the reference value of the input shaft (S550).

The clutch control module 450 determines whether the speed of the input shaft is more than a value acquired by adding the updated reference value of the input shaft and the corrected setting value for determining the inflection point (S560) and releases the clutch 470 when the speed of the input shaft is more than the value acquired by adding the updated reference value of the input shaft and the corrected setting value for determining the inflection point (S570).

Last, the clutch control module 450 updates the touch point (S580). In detail, the clutch control module 450 updates the clutch position corresponding to the updated reference value of the input shaft to the touch point. Herein, the updated touch point may be acquired by subtracting a touch point offset value from the upper limit value of the clutch position corresponding to the corrected setting value for determining the inflection point. The touch point offset value may be set differently depending on the slope of the clutch position for detecting the touch point. That is, since as the slope of the touch point is larger, an increase amount of the touch point up to an occurrence time of the inflection point is larger, the touch point offset value may be set to a large value.

The aforementioned method may be implemented through various means. For example, the exemplary embodiments of the present disclosure may be implemented by hardware, firmware, software, or combinations thereof.

When the exemplary embodiments of the present disclosure are implemented by the hardware, a method according to the exemplary embodiments of the present disclosure may be implemented by one or more Application Specific Integrated Circuits (ASICs), Digital Signal Processors (DSPs), Digital Signal Processing Devices (DSPDs), Programmable Logic Devices (PLDs), (Field Programmable Gate Arrays (FPGAs), processors, controllers, microcontrollers, and microprocessors.

When the exemplary embodiments of the present disclosure are implemented by the firmware or the software, the method according to the exemplary embodiments of the present disclosure may be implemented in a module, a procedure or a function that performs the aforementioned functions or operations. A software code is stored in a memory unit to be driven by the processor. The memory unit is positioned inside or outside the processor to transmit and receive data to and from the processor by various already known means.

As described above, the exemplary embodiments have been described and illustrated in the drawings and the specification. The exemplary embodiments were chosen and described in order to explain certain principles of the disclosure and their practical application, to thereby enable others skilled in the art to make and utilize various exemplary embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

What is claimed is:

1. A method for detecting a touch point of a clutch, the method comprising:
    calculating drag torque using a speed and an acceleration of an input shaft to change a detection range of the touch point;
    determining a lowest value of the speed of the input shaft within the changed detection range of the touch point;
    setting the lowest value to a reference value of the input shaft; and
    updating the touch point as a clutch position matched to the reference value.

2. The method of claim 1, further comprising:
    releasing the clutch when the speed of the input shaft is greater than a value acquired by adding the reference value of the input shaft and a corrected setting value for determining the lowest value.

3. The method of claim 1, further comprising:
correcting a setting value for determining the lowest value.

4. The method of claim 1, wherein an upper limit value of the clutch position is changed through the setting value when the lowest value is changed.

5. The method of claim 4, wherein the upper limit value of the clutch position is proportional to the setting value for determining the lowest value.

6. The method of claim 1, wherein the updated touch point is a value acquired by subtracting a touch point offset value from an upper limit value of the clutch position corresponding to a corrected setting value for determining the lowest value.

7. The method of claim 6, wherein the touch point offset value is proportional to a slope of the touch point.

8. An apparatus for detecting a touch point of a clutch, the apparatus comprising:
a engine speed sensor configured to sense a speed and an acceleration of an input shaft; and
a clutch control module configured to:
calculate drag torque using a speed and an acceleration of an input shaft to change a detection range of the touch point;
determine a lowest value of the speed of the input shaft within the changed detection range of the touch point;
set the lowest value to a reference value of the input shaft; and
update the touch point as a clutch position matched to the reference value.

9. The apparatus of claim 8 is further configured to release the clutch when the speed of the input shaft is greater than a value acquired by adding the reference value of the input shaft and a corrected setting value for determining the lowest value.

10. The apparatus of claim 8 is further configured to correct a setting value for determining the lowest value.

11. The apparatus of claim 8, wherein an upper limit value of the clutch position is changed through the setting value when the lowest value is changed.

12. The apparatus of claim 11, wherein the upper limit value of the clutch position is proportional to the setting value for determining the lowest value.

13. The apparatus of claim 8, wherein the updated touch point is a value acquired by subtracting a touch point offset value from an upper limit value of the clutch position corresponding to a corrected setting value for determining the lowest value.

14. The apparatus of claim 13, wherein the touch point offset value is proportional to a slope of the touch point.

* * * * *